Oct. 30, 1928.
A. F. SANFORD
1,689,602
RADIO APPARATUS
Filed June 30, 1924
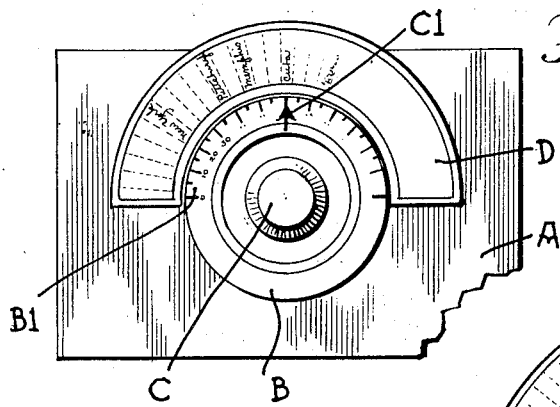
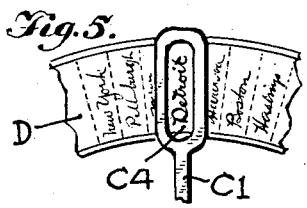
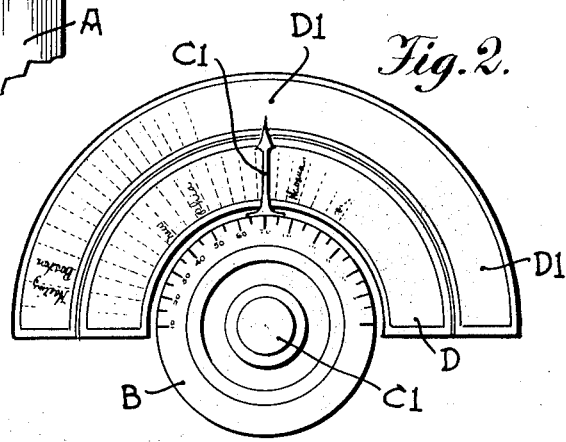
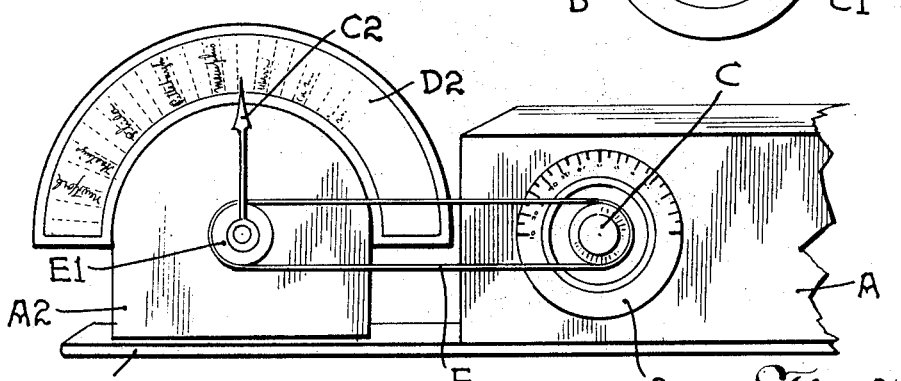
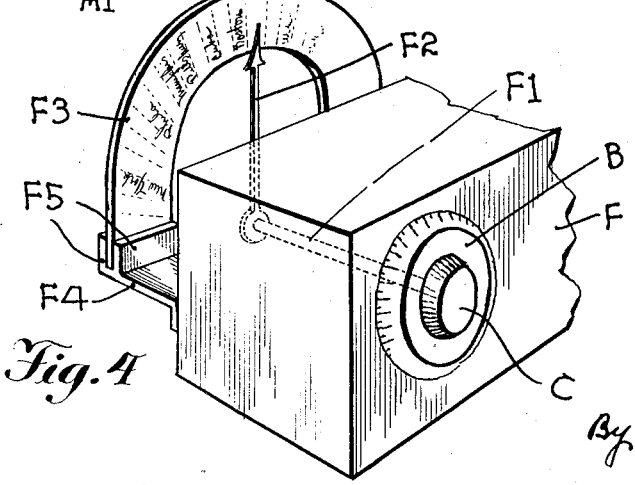
Inventor
Alfred F. Sanford
By Cyrus Kehr
Attorney Patented Oct. 30, 1928.

1,689,602

UNITED STATES PATENT OFFICE.

ALFRED F. SANFORD, OF KNOXVILLE, TENNESSEE.

RADIO APPARATUS.

Application filed June 30, 1924. Serial No. 723,286.

My improvement relates to radio receiving apparatus and particularly to means for conveniently indicating or recording pointer or dial positions for receiving from chosen sending stations.

The dial positions to receive from a chosen sending station on a given receiving set vary with the conditions associated with that set. For example, variation in the length or efficiency of the antennæ will require changes in the positioning of the dial pointer.

My improvement consists in means associated with the dial or pointer for by the operator indicating the dial pointer position when the pointer has been by trial adjusted to receive from the chosen sending station, such record or indication then retaining its position to aid in thereafter adjusting the apparatus for again receiving from that sending station without trial or testing.

In the accompanying drawing,

Fig. 1 is a front elevation of a part of a receiving set in which my improvement is associated with the dial;

Fig. 2 is a similar elevation showing my improvement associated with the dial in amplified form;

Fig. 3 is a similar elevation, my improvement being associated with the dial in still another form;

Fig. 4 is a perspective view showing my improvement associated with the dial in yet another form;

Fig. 5 is a detail view.

Referring first to Fig. 1, A is a part of the front wall of a radio receiving set. B is the dial. C is the rotary knob on which is the radial pointer, C¹. On the outer face of the upper part of the dial are graduation marks or symbols, B¹, which are used to indicate the positions of the pointer, C¹, relative to the mechanism in the interior of the apparatus.

The mechanism thus far described is known and in ordinary use.

Partially surrounding and concentric with the dial, B, is my record-receiving member, D. This is a flat strip or body on which may be placed writing indicating various sending stations.

This member, D, may be applied and secured to the dial, B, or to the wall, A, in any suitable manner. This member is preferably made of sheet-form material having an outer surface adapted to receive writing. Heavy paper or cardboard is recommended.

For operation, if it is desired to tune for a chosen sending station, for example, New York city, the knob C, is turned for adjusting the interior mechanism of the receiving set until it is found that the set is in tune with New York city. During the turning of the knob in effort to find New York city, the pointer, C¹, is turned with the knob, C, for the pointer is supported immovably on the knob or on the body which is immovably joined with the knob.

As a next step, the operator writes, "New York city" or symbols representing New York city on the outer face of the member, D, opposite the then position of the pointer, C¹.

Thereafter to get the receiving set into tune with New York city, it is necessary merely to turn the knob until the pointer is opposite "New York city" or the symbol used for that station.

In Fig. 2, the knob and the dial and the pointer and the record receiving member, D, are present as in Fig. 1, and there is added a second record receiving member, D¹, which partially surrounds and is concentric with the member, D. This second record receiving member may be added to afford space for recording names or symbols of sending stations with which the receiving apparatus has been put into tune through a change of the apparatus for a different wave length control. Thus the same pointer position may stand for two sending stations, one of which is indicated on the record receiving member, D, while the other is indicated on the record receiving member, D¹. The number of record receiving members may be further increased according to the number of wave length changes to which the apparatus is adapted.

In Fig. 3, the record receiving member, D², and a pointer, C², are associated with the dial, B, by means of a belt, E, applied to the knob, C, and to a roller or pulley, E¹, which is supported rotatably on the wall, A², which rests on the base, A¹, which base also supports the wall, A. The roller, E¹, supports a pointer, C², rigid with the roller. On the wall, A², is supported a record receiving member, D², which is concentric with the axial line of the roller, E¹. The pointer, C², reaches outward partially across or near enough to the member, D², to facilitate the placing of a record on the member, D², in relation to the pointer when the dial has been turned to bring the receiving set into tune with the desired sending station. The roller or pulley, E¹, is preferably made of the same diameter as the diameter of the part of the knob which receives the belt, E, in order that the knob and the pulley and the pointer, C², will move in unison and through equal parts of the circle when the knob is turned by the operator.

In Fig. 4, the knob, C, has a shaft, F¹, extending rotatably through the dial, B, and the body or box, F, of the apparatus. On the rear end of said shaft is fixed the pointer, F². A semi-circular record receiving member, F³, like the record receiving members, D, D¹, and D², already described, is supported on brackets, F⁴, mounted on the rear of the body, F, only one of said brackets being shown in the drawing. Said brackets have upward-directed jaws, F⁵, between which the lower part of the record receiving member rests.

When the knob, C, is turned, the pointer, F², turns in unison with the knob and passes over or near the front face of the record receiving member, F³.

As stated above, all the record receiving members are to be made of material having a front face adapted to receive writing. These members are to be made in any desired numbers and adapted to be applied to and removed from the remainder of the apparatus, in order that when one member has been used to such extent that the writing thereon needs to be changed or renewed, that member may be removed and a new member substituted.

In Fig. 5, the outer end of the pointer, C¹, is expanded to extend entirely across the record receiving member, D, and the part of the pointer, which over-laps the member, D, is slotted in the direction of the length of the pointer—transversely to the member, D. Said slotted arm serves to concentrate observation upon the part of the record receiving member, D, with which the pointer stands related. Thus the writing placed on the member, D, is made more easily readable.

It is to be understood that if the receiving apparatus has more than one dial, record receiving members may be placed into relation with all the dials.

I claim as my invention:

1. In a radio receiving apparatus, the combination of a tuning shaft, a tuning knob on said shaft, a pointer support rotatable on an axis which is non-coincident with the tuning shaft axis, a pointer supported by said pointer support, a writing surface near the path of the free end of the pointer, and motion-transmitting connection between the pointer support and the tuning shaft.

2. In a radio receiving apparatus, the combination of a tuning shaft, a tuning knob on said shaft, a pointer support rotatable on an axis which is non-coincident with the tuning shaft axis, a pointer supported by said pointer support, a writing surface near the path of the free end of the pointer, and a belt connection between said pointer support and the tuning shaft.

3. In a radio receiving apparatus, the combination of a tuning shaft, a tuning knob on said shaft, a pointer support rotatable on an axis parallel to the tuning shaft, a pointer supported by said rotatable member, a writing surface near the path of the free end of the pointer, and a belt connection between said rotatable member and the tuning shaft.

4. In a radio receiving apparatus, the combination of a tuning shaft, a tuning knob on said shaft, a writing surface non-concentric with said shaft, a pointer near said writing surface, a rotatable member supporting the pointer, a belt connection between said rotatable member and the tuning shaft.

In testimony whereof I have signed my name, this 26th day of June, in the year one thousand nine hundred and twenty-four.

ALFRED F. SANFORD.